United States Patent
Iruvanti et al.

(10) Patent No.: US 6,515,061 B1
(45) Date of Patent: Feb. 4, 2003

(54) POLYESTER DISPERSANTS FOR HIGH THERMAL CONDUCTIVITY PASTE

(75) Inventors: Sushumna Iruvanti, Wappingers Falls, NY (US); Keith Scott Olsen, Poughkeepsie, NY (US); Krishna Gandhi Sachdev, Hopewell Junction, NY (US)

(73) Assignee: International Business Machines Corporation, Armonk, NY (US)

( * ) Notice: Subject to any disclaimer, the term of this patent is extended or adjusted under 35 U.S.C. 154(b) by 1371 days.

(21) Appl. No.: 08/958,848

(22) Filed: Oct. 28, 1997

Related U.S. Application Data

(63) Continuation of application No. 08/708,427, filed on Sep. 5, 1996, now abandoned, which is a continuation of application No. 08/477,064, filed on Jun. 7, 1995, now Pat. No. 5,591,789.

(51) Int. Cl.[7] .............................. C08K 3/08; C08K 3/14; C08L 67/00; H01B 1/20
(52) U.S. Cl. ........................ 524/437; 524/401; 524/404; 524/428; 524/430; 524/432; 524/433; 524/439; 524/440; 524/441; 524/487; 252/512; 252/514; 252/516; 252/518
(58) Field of Search ................................. 252/512, 514, 252/516, 518; 524/401, 404, 428, 430, 432, 433, 437, 439, 440, 441, 489

(56) References Cited

U.S. PATENT DOCUMENTS

| | | | |
|---|---|---|---|
| 3,778,287 A | 12/1973 | Frederick et al. | 106/308 |
| 5,094,769 A | 3/1992 | Anderson, Jr. et al. | 252/71 |
| 5,098,609 A | 3/1992 | Iruvanti et al. | 252/511 |
| 5,177,667 A | 1/1993 | Graham et al. | 361/385 |
| 5,213,704 A | 5/1993 | Anderson, Jr. et al. | 252/75 |
| 5,294,830 A | 3/1994 | Young et al. | 257/714 |
| 5,591,789 A | * 1/1997 | Iruvanti et al. | 523/515 |

OTHER PUBLICATIONS

IBM Technical Disclosure Bulletin, vol. 20, No. 10, Mar. 1978, *"Semiconductor Encapsulation"*, Magdo.

IBM Technical Disclosure bulletin, vol. 27, No. 4A, Sep. 1984, *"Heat Sink for Thermal Conduction Module"*, Gruber et al.

* cited by examiner

*Primary Examiner*—Tae H. Yoon
(74) *Attorney, Agent, or Firm*—DeLio & Peterson, LLC; John J. Tomaszewski; Margaret A. Pepper

(57) ABSTRACT

A paste composition having a high thermal conductivity and a relatively low viscosity is used to provide a thermal conductive connection between an electronic component and a cooling device to increase the heat transfer rate between the component and the device cooling the electronic component. The paste composition comprises a non-aqueous dielectric carrier, thermally conductive filler particles and a specially defined dispersant comprising the self-condensation reaction product of a hydroxy fatty acid, the reaction product having an acid number of about 30–100. A 12-hydroxy stearic acid self condensed reaction product is the preferred dispersant.

19 Claims, No Drawings

POLYESTER DISPERSANTS FOR HIGH THERMAL CONDUCTIVITY PASTE

This is a continuation of application(s) Ser. No. 08/708,427 filed on Sep. 5, 1996 now abandoned, which is a continuation of Ser. No. 08/477,064, filed on Jun. 7, 1995, now U.S. Pat. No. 5,591,789.

BACKGROUND OF THE INVENTION

1. Field of the Invention

The present invention relates to high thermal conductivity pastes which are used as a heat transfer means for cooling electronic components such as VLSI chips and, in particular, to a specific dispersant used in the paste to provide a paste having enhanced thermal conductivity and paste properties.

2. Description of Related Art

Electronic devices and components generate heat and in many applications the heat needs to be effectively dissipated for the device to function. In integrated circuit chips mounted in an array on substrates, the need to achieve greater computer speeds and the miniaturization of electronic devices has resulted in components which generate more heat and which require denser packing of the active components of the electronic device. The use of such components and denser packing is only practicable, however, when the heat generated is effectively removed from the active components and a number of techniques have been developed to cool such electronic components.

Liquid coolants are commonly employed in such high density cooling applications and various systems have been disclosed in the art for providing a separate cooling member to cool the component. Fins, channels, baffles, and other heat exchanger type devices have been developed to remove heat from the electronic component. Exemplary apparatus for cooling integrated circuit chips are shown in U.S. Pat. Nos. 5,177,667 and 5,294,830, the disclosures of both patents being herein incorporated by reference.

In most of these cooling devices there is an air space between the electronic component to be cooled and the cooling device which air space has a relatively low heat transfer rate. To overcome this problem, thermal compounds commonly referred to as thermal greases or thermal pastes have been developed to enhance the transfer of heat from the electronic component to the cooling device by contacting and connecting both surfaces and providing a high heat transfer conducting means. The thermal paste must have high thermal conductivity and preferably be an electrical insulator. The paste must also have a low viscosity and be compliant so that the thermal paste can be easily applied to the surfaces of the electronic component to be cooled and can conform with the microscopically rough surface of the electronic component which are often bowed or tilted to minimize air gaps which are detrimental to the cooling process. Low viscosity is also important because the electronic components and the solid bonds that attach the components to a substrate are fragile and the force needed to apply the thermal paste must be minimal. It is a further requirement that the thermal paste be able to withstand power cycling and the mechanical stresses arising from the differences in coefficient of thermal expansion of the electronic component, paste and cooling system over the life of the component without the paste degrading significantly in thermal conductivity or mechanically, such as experiencing phase separation between the liquid and solid components of the paste.

A number of thermal pastes have been developed to be used in electronic systems and, in general, the thermal paste comprises thermally conductive filler particles in a liquid dielectric medium along with other components such as dispersants, antioxidants, and stabilizers.

U.S. Pat. Nos. 5,094,769 and 5,213,704 provide a phase-stable, thermally conductive paste having a relatively constant thermal conductivity and viscosity for transferring heat from electronic components. A critical component of the paste is the use of a coupling agent such as an organosilane which has a functionality which is reactive with the thermally conductive filler particles and a functionality which is of similar polarity to the liquid carrier. The disclosures of these patents are hereby incorporated by reference.

In U.S. Pat. No. 5,098,609 stable high solids, high thermal conductivity pastes are disclosed which contain a stabilizing dispersant to inhibit liquid-solids separation and which facilitate incorporation of more solid fillers into the paste. Examples of stabilizing dispersants are monomeric acids; monomeric, oligomeric and/or polymeric fatty acid esters and salts thereof; petroleum sulfonates; and polyimides. Exemplary of fatty acid esters are the reaction products of hydroxy stearic acid (HSA) and a 5–18 carbon acid or acid chloride. Preferred dispersants are fatty acid esters which are the reaction product of 12 hydroxy stearic acid (12 HSA) and a 5–10 carbon aliphatic acid chloride or 5–18 carbon alicyclic acid chloride or aromatic acid chloride. 12 HSA reacted with itself to yield a polymeric/oligomeric material is also disclosed to be useful. Polyesters as disclosed in U.S. Pat. No. 3,778,287 to Stansfield and Hypermers made by ICI are disclosed in the patent as being useful as the stabilizing dispersant. The disclosures of both patents are hereby incorporated by reference.

Increasing demands of industry however, are requiring pastes having improved thermal conductivity in order to be used with the new computers and other electronic components now being developed. In general, higher filler loadings are needed for higher thermal conductivity pastes and while pastes having thermal conductivities ranging from 2.2–4.9 W/mK(watts/meter-degree K) are available the pastes tend to be too thick and stiff at the high filler loadings required for thermal conductivities greater than 3 W/mK. Hard, non-compliant and difficult to dispense pastes can not be used for most applications. In addition, commercial pastes and dispersants have shown higher and variable levels of ionics, particularly Cl$^-$, which presents a corrosion concern.

Bearing in mind the problems and deficiencies of the prior art, it is therefore an object of the present invention to provide a thermally conductive paste which may have a wide range of filler loading levels necessary to provide a wide range of thermal conductivity properties with relatively low paste viscosity, compliance, low ionics, paste phase stability and high electrical resistivity.

It is another object of the present invention to provide a method for cooling an electronic component comprising the use of a specially formulated thermally conductive paste to provide a thermal transfer means between the electronic component and the cooling mechanism.

It is yet another object of the present invention to provide high thermal conductivity compliant pastes using 12-hydroxy stearic acid derived polymeric dispersants with Acid Nos. in the range of 30–100.

Still other objects and advantages of the invention will in part be obvious and will in part be apparent from the specification.

SUMMARY OF THE INVENTION

The aforementioned objects and advantages are achieved in the present invention which relates in one aspect to a paste having a high thermal conductivity comprising:

a non-aqueous dielectric liquid carrier;

a solid thermally conductive filler dispersed in the liquid carrier; and a dispersant which is a polyester self-condensation reaction product of a hydroxy fatty acid or mixture of hydroxy fatty acids, the polyester reaction product having an Acid No. of about 30–100, preferably 45–85 and most preferably 50–75. The hydroxy fatty acid is preferably 12-hydroxy stearic acid (12 HSA) and the preferred polyester reaction product is a self-condensation reaction product of 12-HSA.

In another aspect of the invention, a method is provided for cooling an electronic component comprising:

providing an electronic component to be cooled;

providing a cooling means surface proximate to the electronic component; and applying a layer of a thermally conductive paste comprising a polyester self-condensation reaction product of a hydroxy fatty acid, preferably 12-HSA, having an Acid No. of about 30–100, preferably 45–85 and most preferably 50–75, to the electronic component surface and to the cooling means surface to provide a thermal paste connection between the electronic component and the cooling surface.

DESCRIPTION OF THE PREFERRED EMBODIMENTS

The filler particles which may be used in the invention may be selected from a wide variety of materials which exhibit a relatively high thermal conductivity such as boron nitride, vanadium boride and aluminum spheres. The particles are preferably electrical insulators. The preferred shape is spherical or cubic so that packing density is maximized while providing a low viscosity of the dispersion of particles in the liquid dielectric carrier. Other shaped materials such as platelets may be used. A mixture of particle size distribution is preferred.

The thermally conductive filler particles are preferably treated before they are dispersed in the liquid carrier so that their surface is modified. The particles may be modified by heat treating such as calcining in air in order to remove low surface energy organic contaminants absorbed from the ambient so they have a higher surface energy than the liquid carrier and are wetted by the liquid carrier. Exemplary metal fillers which may be used in the invention include, aluminum, silicon, copper and silver. Ceramic fillers such as silicon carbide, aluminum nitride, boron nitride, vanadium boride, diamond, aluminum oxide, zinc oxide, magnesium oxide and silicon dioxide may be employed. Mixtures of fillers may also be utilized to provide a paste having certain features depending upon the application. It is preferred that the particle size of the solid fillers be between 0.05 $\mu$m and 20 $\mu$m although lower and higher particle sizes may also be used.

The thermally conductive filler particles in the paste composition will generally be, in volume %, in a minimum amount of about 25% and usually about 50 to 85%, preferably, 60 to 80%.

The liquid carrier is typically an oily, solvent cleanable dielectric fluid preferably a hydrocarbon liquid carrier, which is nonpolar and chemically saturated so that it does not absorb moisture and thereby cause corrosion of the electronic component. For the resulting paste composition to be mobile and compliant, the liquid carrier typically has a viscosity of approximately 1, e.g., 5 centipoise to about 500 centipoise at 100° C. Dielectric fluids such as paraffinic hydrocarbons, polyphenylether oils, silicone oils, glycerides and preferably mineral oil and synthetic mineral oil (e.g., synthetic poly(alpha-olefin)) may be used. The most preferred liquid carrier because of its demonstrated effectiveness is chemically saturated poly(alpha-olefin) having a viscosity of approximately 2–150 centipoise preferably 40–120 centipoise at 100° C. It is preferred that the polarity of the liquid carrier should preferably match the polarity of additives which may be used in the paste composition. A matching polarity promotes mutual affinity so that phase separation of the paste is minimized. It is most preferred that the polarity of the liquid carrier be nonpolar so that the affinity of the paste for moisture will be low and thus there is no corrosion concern.

The liquid carrier comprises about 5 to 55 volume % of the paste composition, preferably 5% to 40%.

It is an important feature of the invention that a specially defined dispersant material be used in the paste composition to provide a paste having the desired thermal conductivity and paste properties. Broadly stated, it has been found that when a hydroxy fatty acid or mixture of hydroxy fatty acids is self condensed and the reaction controlled to produce a reaction product having an Acid No. of about 30–100, use of this reaction product as a dispersant provides a thermal paste having enhanced thermal and paste properties. Acid No. values less than about 30 and above about 100, e.g., 200, may be used for certain applications requiring a thicker paste. The Acid No. is a well known value associated with the acid strength of a substance and is defined as the milligrams (mgs) of KOH required to neutralize the acid in a one gram sample of the product being measured. The higher the amount of acid in the sample the more KOH needed to neutralize the acid and the higher the Acid No.

Polyesters derived from hydroxy fatty acids are well known and a number of such polyesters and the method for making the polyesters is shown in U.S. Pat. No. 3,778,287 supra. Basically, the polyesters are obtained by heating the hydroxy fatty acid or a mixture of such acids or a mixture of a hydroxy fatty acid and a carboxylic acid optionally in the presence of an esterification catalyst, preferably at a temperature in the region of 160° to 200° C. until the required polyester has been obtained. To make the paste compositions of the present invention the course of the self-condensation esterification reaction would be followed by periodically measuring the Acid No. of the reaction mixture so that the reaction can be stopped when the Acid No. is within the desired range of about 30–100. Water is formed in the esterification reaction and is removed from the reaction medium by passing a stream of nitrogen over the reaction mixture or, preferably, by carrying out the reaction in the present of a solvent such as toluene or xylene and azeotropically removing the water as it is formed. The resulting polyesters can then be isolated in a conventional manner for use to make the paste composition.

Salts of the polyesters may also be employed in the invention and include alkali metal salts such as sodium and potassium and alkaline earth metal salts such as calcium, barium, magnesium and titanium. These salts may conveniently be obtained, for example, by heating the polyester with an oxide, hydroxide or carbonate of the metal at elevated temperatures. Amine salts may also be suitably employed.

The hydroxy fatty acids useful to form the reaction products preferably contain from 12 to 20 carbon atoms and it is highly preferred that there be between 8 and 14 carbon atoms between the carboxylic acid and hydroxy groups. As specific examples of such hydroxycarboxylic acids there may be mentioned ricinoleic acid, 5-, 7-, 9-, 10- and 16-hydroxy stearic acids and 12-hydroxy stearic acid. Mixtures of the hydroxy fatty acids may be used. Also, the commercially available hydrogenated castor oil fatty acid which contains in addition to 12-hydroxy stearic acid minor amounts of stearic acid and palmitic acid may be used.

A highly preferred embodiment because of its demonstrated effectiveness is the reaction product of 12-hydroxy stearic acid (12-HSA) with itself(self-condensation) to form a polyester having an acid number of about 30–100, most preferably 50–75. As shown herein below in the examples, these 12-HSA polyesters enable the making of a paste composition having a high thermal conductivity with a paste viscosity desired for use on electronic components.

The range of the dispersant in the paste composition is generally about 1 to about 10 weight %, preferably 2–7%, e.g., 3–5%.

Other materials may be utilized in the paste composition as known in the art to provide particular desired effects. Thus, the stability of the paste composition may be enhanced by the addition of chemically inert particles of high surface area to resist phase separation by absorbing excess liquid carrier in those situations where the electronic component power cycling leads to thermal/mechanical stressing of the paste composition and a propensity for the paste composition to bleed. Fumed silica or other such particles may be incorporated in the composition to increase the capacity of the paste composition to avoid irreversible bleeding. As discussed in U.S. Pat. No. 5,094,769 supra, the addition of a polymer such as polyisobutylene to a paste composition enhances the shear stability of the composition. It would also be advantageous to incorporate an antioxidant in the paste composition so that any exposure of the compound to oxygen or other oxidizing agents will not cause a chemical change causing phase separation.

In a highly preferred embodiment of the invention, aluminum/aluminum oxide fillers having a particle size of 0.1–15 $\mu$m and poly(alpha-olefin) oil is preferred. The preferred dispersant is the self-condensation reaction product of 12-HSA having an acid number of about 50–75. The composition preferably comprises about 60–80 volume % filler, preferably 70–74%, about 2–7 weight % of the polyester dispersant and the balance poly(alpha-olefin)oil.

The paste composition are of low enough viscosity to be mobile during modular assembly to follow the surface contour of the electronic component but viscous enough so as to be stable mechanically when applied in small gaps to form the heat conductive path especially when exposed to power fluctuations. In state of the art semiconductor components, these gaps may be as low as 5 mils or less to minimize the length of the thermal path. This small gap causes high shear forces to be applied to the thermal compound which adds to the stability problem. To satisfy these criteria as well as accomplishing all of the other advantages provided by the thermally conductive compounds of the present invention, it is preferred that the paste composition comprise about 60% to 80% by volume filler particles, about 2% to 7% by weight dispersant and the balance being the liquid carrier. It is desired that the pastes have a thermal conductivity above about 2.8 W/mK, preferably above about 3.5, with a viscosity less than about 20,000 Pa-sec.

Preferred paste viscosity are below about 12,000 Pa-sec, preferably about 6,000–10,000 Pa-sec and above about 3,000 Pa-sec.

The paste compositions of the present invention may be made by any means known to those skilled in the art. Generally, the dispersant and liquid carrier are blended and then the solid filler is added gradually with continual stirring. This mixture of solids and liquids is then milled using known techniques (e.g., roll mill) to produce a homogeneous paste. The paste may then be stored or used in the desired application. In a preferred embodiment, the filler particles are treated with a solution of the dispersant in a non-aqueous solvent such as hexane. The heterogeneous mixture is stirred for adsorption of the dispersant on the particles. The solvent is removed by heat and vacuum. The oil carrier is then blended with the treated particles and the slurry homogenized preferably with a roll mill.

The following examples describe the manner and process of making and using the invention and set forth the best mode contemplated by the inventors for carrying out the invention, but are not to be construed as limiting.

EXAMPLE 1

Polyesters 1–7 of the invention were prepared by reacting 12-HSA in solution in xylene under a nitrogen atmosphere, at a temperature of about 180° C.–190° C. with azeotropic removal of water as formed. The reaction time depended on the polyester formed and is generally between about 4 to 24 hours. The reaction was stopped when the desired Acid No. was reached and the polyester separated from the solution by solvent removal under vacuum at less than 100° C.

Thermally conductive pastes were prepared by dispersing 72% by volume aluminum and calcined aluminum oxide filler having a particle size of about 0.5–7 $\mu$m in poly(alpha-olefin) oil with 3–5% by weight of the above 12-HSA reaction product. The results are as indicated in the Table below.

TABLE

| Run No. | Acid No. | Paste Viscosity Pa-sec | Conductivity W/mK |
|---|---|---|---|
| 1 | 31 | 15,140 | 3.6 |
| 2 | 37 | 12,240 | 3.7 |
| 3 | 38 | 13,163 | 3.9 |
| 4 | 63 | 9,854 | 3.7 |
| 5 | 73 | 9,977 | 3.9 |
| 6 | 75 | 7,217 | 3.9 |
| 7 | 50 | 9,738 | 3.9 |

As can be seen from the above results, pastes made in runs 1, 2 and 3 using polyesters having an Acid No. between 31 and 38 have high thermal conductivity but a relatively high paste viscosity. These pastes while relatively stiff are still useful for certain applications. Pastes made in runs 4–7 using polyesters having Acid Nos. in the preferred range of 50–75 provided pastes having both high thermal conductivity and a preferred paste viscosity. These pastes are preferably employed on electronic components such as IC chips cooled by a cooling surface proximate the chip.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

Thus, having described the invention, what is claimed is:
What is claimed is:

1. A thermally conductive paste having enhanced thermal conductivity and paste properties comprising:
   a non-aqueous dielectric liquid carrier;
   a solid thermally conductive filler in an amount of about 50–85% by volume of the paste dispersed in the liquid carrier; and
   a dispersant which is a polyester self-condensation reaction product of a hydroxy fatty acid or mixture of hydroxy fatty acids the reaction product having an Acid No. of about 45–85 in an amount of about 1 to 10 weight % of the paste.

2. The paste of claim 1 wherein the carrier is selected from the group consisting of mineral oil, synthetic poly(alpha-olefin) oils, polyphenylether oils and mixtures thereof.

3. The paste of claim 1 wherein the filler is aluminum and aluminum oxide.

4. The paste of claim 1 wherein the filler is selected from the group consisting of aluminum, silicon, copper, silver, silicon carbide, aluminum nitride, boron nitride, diamond, aluminum oxide, zinc oxide, magnesium oxide, silicon dioxide vanadium boride and mixtures thereof.

5. The paste of claim 4 wherein the filler has a particle size of about 0.05 to 20 μm.

6. The paste of claim 1 wherein the dispersant is a self-condensation reaction product of a 12–20 carbon atom hydroxy fatty acid or mixture of hydroxy fatty acids.

7. The paste of claim 6 wherein the hydroxy fatty acid is 12-hydroxy stearic acid having an Acid No. of about 50–75.

8. The paste of claim 1 wherein the dispersant is about 2 to about 7% by weight.

9. The paste of claim 8 wherein the liquid carrier is a poly(alpha-olefin) oil, the filler is aluminum and aluminum oxide and the dispersant is the self-condensation reaction product of 12-hydroxy stearic acid having an Acid No. of about 50–75.

10. A method for increasing the cooling of an electronic component by the use of a cooling member proximate to the electronic component comprising applying a thermally conductive paste to the surface of the electronic component and the cooling member, the paste comprising:
   a non-aqueous dielectric liquid carrier;
   a solid thermally conductive filler in an amount of about 50–85% by volume of the paste dispersed in the carrier; and
   a dispersant which is a polyester self-condensation reaction product of a hydroxy fatty acid or mixture of hydroxy fatty acids having an Acid No. of about 45–85 in an amount of about 1 to 10 weight % of the paste.

11. The method of claim 10 wherein the dielectric carrier is a poly(alpha-olefin) oil.

12. The method of claim 10 wherein the filler is aluminum and aluminum oxide.

13. The method of claim 10 wherein the filler is selected from the group consisting of aluminum, silicon, copper, silver, silicon carbide, aluminum nitride, boron nitride, diamond, aluminum oxide, zinc oxide, magnesium oxide, silicon dioxide, vanadium boride and mixtures thereof.

14. The method of claim 10 wherein the dispersant is a self-condensation reaction product of 1 2-hydroxy stearic acid.

15. The method of claim 14 wherein the dispersant has an Acid No. of about 50–75.

16. A method for making a thermally conductive paste comprising:
   dispersing a polyester dispersant which is self-condensation reaction product of a hydroxy fatty acid or mixture of hydroxy fatty acids having an Acid No. of about 45–85 into a dielectric liquid carrier in an amount of about 1 to 10 weight % of the paste; and
   dispersing a high thermal conductivity filler material into the above mixture in an amount of about 50–85% by volume of the paste so that a homogenous composition is formed.

17. The method of claim 16 wherein the paste is homogenized using a roll mill.

18. A thermally conductive paste having enhanced thermal conductivity and paste properties comprising:
   a non-aqueous dielectric liquid carrier;
   a solid thermally conductive filler in an amount of about 60–80% by volume of the paste dispersed in the liquid carrier; and
   a dispersant which is a polyester self-condensation reaction product of a hydroxy fatty acid or mixture of hydroxy fatty acids the reaction product having an Acid No. of about 50–75 in an amount of about 3–5 weight % of the paste.

19. A method for increasing the cooling of an electronic component by the use of a cooling member proximate to the electronic component comprising applying a thermally conductive paste to the surface of the electronic component and the cooling member, the paste comprising:
   a non-aqueous dielectric liquid carrier;
   a solid thermally conductive filler in an amount of about 60–80% by volume of the paste dispersed in the carrier; and
   a dispersant which is a polyester self-condensation reaction product of a hydroxy fatty acid or mixture of hydroxy fatty acids having an Acid No. of about 50–75 in an amount of about 3–5 weight % of the paste.

* * * * *